United States Patent
Clark et al.

(10) Patent No.: US 7,862,437 B2
(45) Date of Patent: Jan. 4, 2011

(54) SPRING-MASS DAMPER SYSTEM FOR VEHICLE TRANSMISSION

(75) Inventors: Steven L. Clark, Canton, MI (US); Jeffrey R. Lee, Tipton, MI (US); Peter W. Mack, Dearborn, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 554 days.

(21) Appl. No.: 11/862,367

(22) Filed: Sep. 27, 2007

(65) Prior Publication Data

US 2009/0088261 A1    Apr. 2, 2009

(51) Int. Cl.
*F16F 15/121*    (2006.01)

(52) U.S. Cl. .................................. 464/68.92

(58) Field of Classification Search .............. 464/68.9, 464/68.92; 192/203–205; 267/178, 179
See application file for complete search history.

(56) References Cited

U.S. PATENT DOCUMENTS 5,657,845 A * 8/1997 Szadkowski et al. .. 464/68.92 X

2004/0200313 A1 * 10/2004 Kroll et al.

FOREIGN PATENT DOCUMENTS

| CN | 1274655 A | 11/2000 |
|---|---|---|
| CN | 101031735 A | 9/2007 |

* cited by examiner

*Primary Examiner*—Greg Binda
(74) *Attorney, Agent, or Firm*—Quinn Law Group, PLLC

(57) ABSTRACT

A damper assembly for absorbing and attenuating torsionals and vibrations transmitted from an engine to a transmission is provided. The damper assembly includes a damper flange with a plurality of spring-mass damper systems operatively attached thereto and elongated circumferentially about its outer periphery. Each spring-mass damper systems include an inner spring nestably positioned inside an outer spring, a first spring retainer having a base portion defining a first interface surface with a first pilot portion extending therefrom to define a second interface surface with a second pilot portion extending therefrom, and a second spring retainer having a base portion defining an interface surface with a pilot portion extending therefrom to define a fourth interface surface. The first and third pilot portions engage with and thereby restrict axial and radial movement of the outer spring. The second pilot portion is attached to the inner spring thereby restricting relative movement therebetween.

7 Claims, 2 Drawing Sheets

SPRING-MASS DAMPER SYSTEM FOR VEHICLE TRANSMISSION

TECHNICAL FIELD

The present invention relates generally to vehicle powertrain systems, and more particularly to power transmissions having attached thereto a torsional damper assembly for minimizing or cancelling the compression pulses, vibrations, and associated noise produced by an internal combustion engine.

BACKGROUND OF THE INVENTION

Most conventional motorized vehicles include a powertrain with a power source, such as an internal combustion engine or ICE, connected to a power transmission adapted to manipulate and transmit power from the engine to a final drive system (e.g., driveshaft, differential, and wheels.) Some transmissions include a hydrodynamic input device, such as a torque converter, positioned between the engine and the transmission. The torque converter is a hydrokinetic fluid coupling employed predominantly to allow the engine to run without stalling when the vehicle wheels and transmission gears come to a stop, and to provide torque multiplication in the lower speed range of the engine. Certain torque converter assemblies integrate a torque converter clutch (TCC), also known as a lockup clutch, to provide a bypass mechanism, allowing the engine to circumvent the torque converter and transmit power directly to the transmission.

As a result of intermittent combustion and cyclical piston motion, ICEs may generate torsionals or vibrations during normal operation that are undesirable to transmit to the vehicle transmission. The degree of engine torsional excitation is typically exacerbated in proportion with the number of cylinders. ICEs equipped with displacement-on-demand functionality can selectively deactivate certain engine cylinders to save on fuel. This mode of operation may produce distinctive (or inconsistent) torque fluctuations from the engine operating on all cylinders. Finally, an ICE may also generate compression pulses during startup and shutdown operations.

To isolate and counteract the unwanted torsionals generated by the engine, various damper systems have been implemented into the powertrain system. These dampers are generally packaged between the engine's output shaft (e.g., crankshaft) and the input shaft of the transmission (e.g., turbine shaft.) Some damping devices are configured with coil springs that have the capacity to carry maximum engine torque plus some margin above. To this regard, the lockup clutch may include elongated arc-shaped, circumferentially extending springs that are compressed when a shock or torsional vibration occurs during a lockup operation, i.e., engagement of the lockup clutch.

In hybrid-type vehicles (e.g., a vehicle configured with a powertrain using one or more electric motors individually or in concert with an ICE for propulsion), the hybrid ICE typically operates at lower speeds more often than in traditional automobiles, and can be turned on and off while the hybrid vehicle is being propelled by the electric motor(s). Consequently, the ICE in hybrid vehicles may be subjected to startup and shutdown operation more frequently than engines used in non-hybrid powertrains. Much like its traditional counterpart, the hybrid ICE may generate compression pulses during starts and stops that can produce undesirable vibration in hybrid vehicles.

SUMMARY OF THE INVENTION

In order to reduce driveline vibrations in a vehicle powertrain, and improve torque converter balancing, the present invention provides a spring-mass damper system assembly providing step-rate dampening effect. According to one aspect of the present invention, a spring retainer is provided for use in a vehicle powertrain damper assembly that has one or more inner springs each defining a first inner diameter, and one or more outer springs each defining a second inner diameter, the second diameter being greater than the first diameter. The spring retainer includes a base portion and first and second pilot portions. The base portion defines a first interface surface that is configured to engage with a respective outer spring. The first pilot portion extends from the first interface surface and also defines a second interface surface that is configured to engage with a respective inner spring. The second pilot portion extends from the second interface surface, and is configured to secure, attach, or adhere, preferably by means of a press fit, to the inner spring and thereby restrict relative movement therebetween. It is preferred that the first and second pilot portions extend substantially perpendicularly from their respective interface surfaces.

Ideally, the base portion and first and second pilot portions are all substantially cylindrical segments. In this instance, it is also preferred that the first pilot portion further defines a third diameter that is greater than the first inner diameter of the inner spring and less than the second inner diameter of the outer spring. Similarly, it is also preferred that the second pilot portion defines a fourth diameter that is greater than the first inner diameter of the inner spring and less than the third diameter of the first pilot portion. Alternatively, the base portion and first and second pilot portions may take on other various geometries. For example, the second pilot portion may take on any geometric configuration inscribable within the first inner diameter of the inner spring to secure, attach, or adhere the second pilot portion to the inner spring and thereby restrict relative movement therebetween.

According to another aspect of the present invention, a torsional damper assembly is provided for absorbing and attenuating torsionals and vibrations transmitted to a power transmission. The torsional damper assembly includes a damper flange having an outer periphery with one or more spring-mass damper systems operatively attached thereto and elongated circumferentially about the outer periphery of the damper flange. At least one, but preferably all of the spring-mass damper systems include an inner spring defining first inner and outer diameters, and an outer spring defining second inner and outer diameters. The second inner diameter is sufficiently larger than the first outer diameter so as to allow the inner spring to be nestably positioned inside of the outer spring. Preferably, the inner spring also defines a first length that is shorter than a second length defined by the outer spring.

The spring-mass damper system also includes first and second spring retainers. The first spring retainer has a first base portion defining a first interface surface with a first pilot portion preferably extending substantially perpendicularly therefrom. The first pilot portion defines a second interface surface with a second pilot portion preferably extending substantially perpendicularly therefrom. The second spring retainer has a second base portion defining a third interface surface configured with a third pilot portion preferably extending substantially perpendicularly therefrom, the third pilot portion defining a fourth interface surface. The first and third interface surfaces are configured to engage with a respective outer spring, while the second and fourth interface surfaces are configured to engage with a respective inner spring. Additionally, the first and third pilot portions are configured to engage with and thereby restrict axial and radial movement of the outer spring. Finally, the second pilot portion is configured to secure, attach, or adhere, preferably by means of a press fit, to the inner spring and thereby restrict relative movement therebetween.

According to yet another aspect of the present invention, a transmission is provided in power flow communication with a torque converter assembly to drivingly connect a final drive system to an internal combustion engine. The engine is characterized by compression pulses generated during startup and/or shutdown operations, and torsionals generated during other modes of engine operation. The transmission comprises a damper flange having a plurality of spring-mass damper systems operatively attached thereto and elongated circumferentially about its outer periphery. At least one, but preferably all of the spring-mass damper systems include an inner spring defining a first length and first inner and outer diameters, and an outer spring defining a second length and second inner and outer diameters. The second inner diameter is sufficiently larger than the first outer diameter so as to allow the inner spring to be nestably positioned inside the outer spring.

Each spring-mass damper system of the power transmission also includes first and second spring retainers. The first spring retainer has a first base portion defining a first interface surface with a substantially cylindrical first pilot portion that extends substantially perpendicularly therefrom. The first pilot portion defines a second interface surface having a substantially cylindrical second pilot portion that extends substantially perpendicularly therefrom. The second spring retainer has a second base portion that defines a third interface surface with a substantially cylindrical third pilot portion extending substantially perpendicularly therefrom and defining a fourth interface surface. The first and third pilot portions are configured to engage with and thereby restrict axial and radial movement of a respective outer spring. Finally, the inner spring is press fit onto the second pilot portion of the first spring retainer to thereby restrict any relative motion therebetween.

The above features and advantages, and other features and advantages of the present invention will be readily apparent from the following detailed description of the preferred embodiments and best modes for carrying out the invention when taken in connection with the accompanying drawings.

DESCRIPTION OF THE PREFERRED EMBODIMENTS

The present invention is described herein in the context of a hybrid powertrain having a power transmission. Notably, the hybrid power transmission shown in FIGS. 1 and 2 hereof has been greatly simplified, it being understood that further information regarding the standard operation of a hybrid power transmission and so on may be found in the prior art. Furthermore, it should be readily understood that FIGS. 1 and 2 merely offer a representative application by which the present invention may be incorporated, the present invention by no means being limited to the particular powertrain or transmission configuration of FIGS. 1 and 2.

Figure 1:
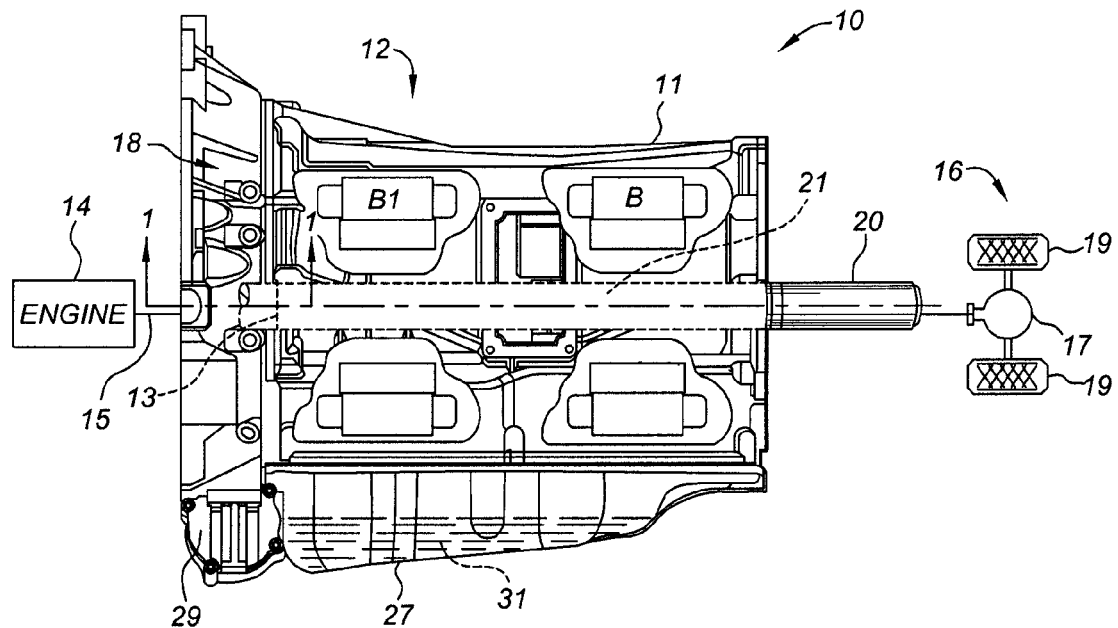
FIG. 1 is a schematic illustration of an exemplary vehicle powertrain having a final drive system drivingly connected to an engine by a power transmission.

Referring to the drawings, wherein like reference numbers refer to the same or similar components throughout the several views, there is shown in FIG. 1 a schematic side view of an exemplary vehicle powertrain system, identified generally as 10, having a restartable engine 14 drivingly connected to a final drive system 16 by a hybrid power transmission 12. The engine 14 transfers power, preferably by way of torque, via the engine crankshaft 15 to the transmission 12. The transmission 12 is adapted to manipulate and distribute power from the engine 14 to the final drive system 16, represented herein by differential 17 and wheels 19, thereby configured to propel the hybrid vehicle (not shown). In the embodiment depicted in FIG. 1, the engine 14 may be any engine, such as a 2-stroke diesel or a 4-stroke gasoline engine, which is readily adapted to provide its available power output typically at a number of revolutions per minute (RPM). Although not illustrated in FIG. 1, it should be appreciated that the final drive system 16 may comprise any known configuration, e.g., front wheel drive (FWD), rear wheel drive (RWD), four-wheel drive (4WD), or all-wheel drive (AWD).

FIG. 1 also displays selected components of the transmission 12, including a main housing 11 configured to encase first and second electric motor/generator assemblies B1 and B, respectively. The first and second motor/generators B1, B are indirectly journaled onto a main shaft 21 of the transmission 12, preferably through a series of planetary gear sets (not shown). The motor/generators B1, B operate with one or more selectively engageable torque transmitting mechanisms (e.g., clutch, brake, etc., not shown herein) to rotate the transmission output shaft 20. An oil pan or sump volume 27 is located on the base of the main housing 11, and is configured to provide hydraulic fluid, such as transmission oil (shown hidden in FIG. 1 at 31) for the transmission 12 and its components. The main housing 11 covers the inner most components of the transmission 12, such as the motor/generators B1, B, planetary gear arrangements, main shaft 21, and torque transmitting devices (all of which are mentioned for exemplary purposes and not all are shown). Additionally, an auxiliary pump 29 is mounted to the base of the input housing 11, and secured nestably adjacent the oil pan 27. Finally, an exemplary hydrodynamic torque converter assembly, identified generally as 18 is adapted to be operatively positioned between the engine 14 and transmission 12.

Figure 2:
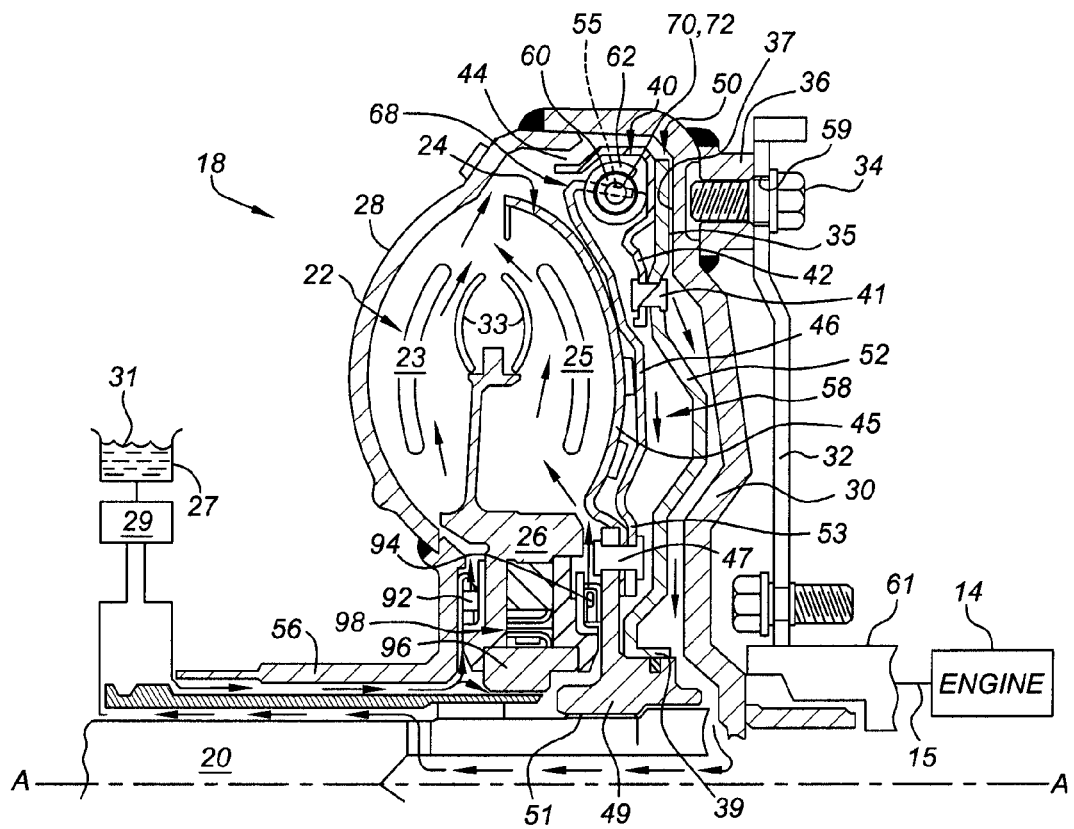
FIG. 2 is a cross-sectional side view of a portion of the power transmission of FIG. 1 taken along line 1-1, provided to illustrate a representative torque converter assembly with lockup clutch having mounted thereto a torsional damper assembly in accordance with one embodiment of the present invention.

FIG. 2 is a cross-sectional side-view of a portion of the exemplary torque converter assembly 18. The torque converter assembly 18 includes a torque converter pump or impeller 22, a bladed turbine 24, a stator 26, and a lockup or bypass clutch, identified generally at 50. The torque converter assembly 18 also includes an annular housing, defined principally by a pump shell portion 28 fixedly attached, e.g., via electron beam welding, mig welding, laser welding, and the like, to an engine-side, front cover 30 such that a working hydraulic fluid chamber is formed therebetween. A flexplate 32 is adapted to connect to one or more lugs 35 projecting from the front cover 30, e.g., via a plurality of apertures 59 formed therethrough that are configured to receive bolts 34, and thereby drivingly connect the annular housing front cover 30 to the engine 14 such that engine torque is transferable therebetween.

The impeller 22 is situated in serial power flow, fluid communication with the turbine 24. The stator 26 is interposed between the impeller 22 and turbine 24 so that it can alter fluid flow returning from the turbine 24 to the impeller 22. The transfer of engine torque from the crankshaft 15 to the turbine 24 via the annular housing front cover 30 and impeller 22 is through the operation of hydraulic fluid, such as transmission oil 31. More specifically, rotation of the impeller blades 23, retained between the pump shell 28 and inner shroud 33, causes the hydraulic fluid 31 to be directed toroidally outward toward the turbine 24. When this occurs with sufficient force to overcome the resistance to rotation, the turbine blades 25, coaxially oriented with the impeller blades 23 and retained between the inner shroud 33 and turbine shell 45, begin to rotate with the impeller 22. The fluid flow exiting the turbine 24 is directed back into the impeller 22 by way of the stator 26. The stator 26, located between the flow exit section of the turbine 24 and the flow entrance section of the impeller 22, redirects the fluid flow from the turbine 24 to the impeller 22 in the same direction as impeller rotation, thereby reducing pump torque and causing torque multiplication.

The torque converter assembly 18 preferably includes first and second thrust bearings 92, 94, respectively, configured to rotatably support the stator 26. The stator 26 is connected to a stator shaft 96 by way of a one-way roller clutch 98 that is operable to prevent rotation of the stator 26 at low torque converter speeds. At higher torque converter speeds, the direction of hydraulic fluid 31 leaving the turbine 24 changes, causing the stator 26 to over-run the one-way clutch 98 and rotate freely on the stator shaft 96. The impeller 22 is secured to the pump hub 56, whereas the turbine 22 is secured to the output shaft 20. Ideally, a turbine hub 49 is disposed between, and configured to operatively couple the turbine 24 and the output shaft 20. The turbine hub 49 is secured to the turbine 24 by, for example, a plurality of rivets 47, and engages the output shaft 20 via a splined interface 51.

Fundamentally, as the internal combustion engine 14 operates at different rotational speeds it may produce torsionals (e.g., vibrations). By way of example, when fuel is being fed to the engine 14 and it is under power, e.g., through engagement of the fuel throttle (not shown herein) during normal operation, the engine 14 may produce torsionals that are undesirable to transmit to, and through the transmission 12. In addition, when the engine 14 is not being fueled or is not under power (as in a startup and/or a shutdown operation) the engine pistons (not shown) may generate compression pulses. Both the torsionals and compression pulses can produce resultant vibrations and noise that may be sensed the vehicle operator.

To cancel out the torsionals and compression pulses that may be produced by the engine 14, the transmission 12 is equipped with a torsional damper assembly 40, as shown in FIG. 2. As will be described in extensive detail below, the torsional damper assembly 40 generally functions to isolate the transmission 12 from unwanted torsionals generated by the engine 14 during operation and also to selectively aide the first and second motor/generator assemblies B1, B in canceling engine compression pulses during startup and shutdown operations.

The torsional damper assembly 40 includes an annular damper flange 42, having one or more spring-mass damper systems, identified generally as 44 and referred to hereinafter as "SDS 44", oriented circumferentially along and proximate to its outer periphery. The damper flange 42 is attached, secured, or extended from a clutch plate 52 (e.g., by means of a rivet 41.) The engine side front cover 30 is affixed, as described above, to the engine crankshaft 15 by way of the interconnection between the flexplate 32 to a crankshaft pilot 61. In addition to operating to transmit torque produced by the engine 14 to the transmission 12, the flexplate 32 also functions to absorb any thrust loads that may be generated by the torque converter 18 hydrodynamics and/or through operation of the lockup clutch 50.

The lockup clutch 50, located inside the vessel 48, consists of the clutch plate 52 which is operable to selectively frictionally engage a friction surface or friction material 35 with an inner contact surface 37 of the front cover 30. The clutch plate 52 is slidably supported on the turbine hub 49 at an annular clutch hub portion 39. The clutch plate 52 preferably moves in response to hydraulic fluid, i.e., transmission oil 31, fed into cavity 58 from an oil source, such as sump volume 27. When the lockup clutch 50 is fully engaged (i.e., when there is no slip between the friction material 36 and surface 37 of the front cover 30) the impeller 22 is frictionally coupled to the turbine 24 such that the two components rotate as a single unit, allowing the engine 14 to circumvent the torque converter assembly 18 and transmit power directly to the transmission 12 without any efficiency losses associated with operation of the hydraulic fluid 31.

Figure 3:
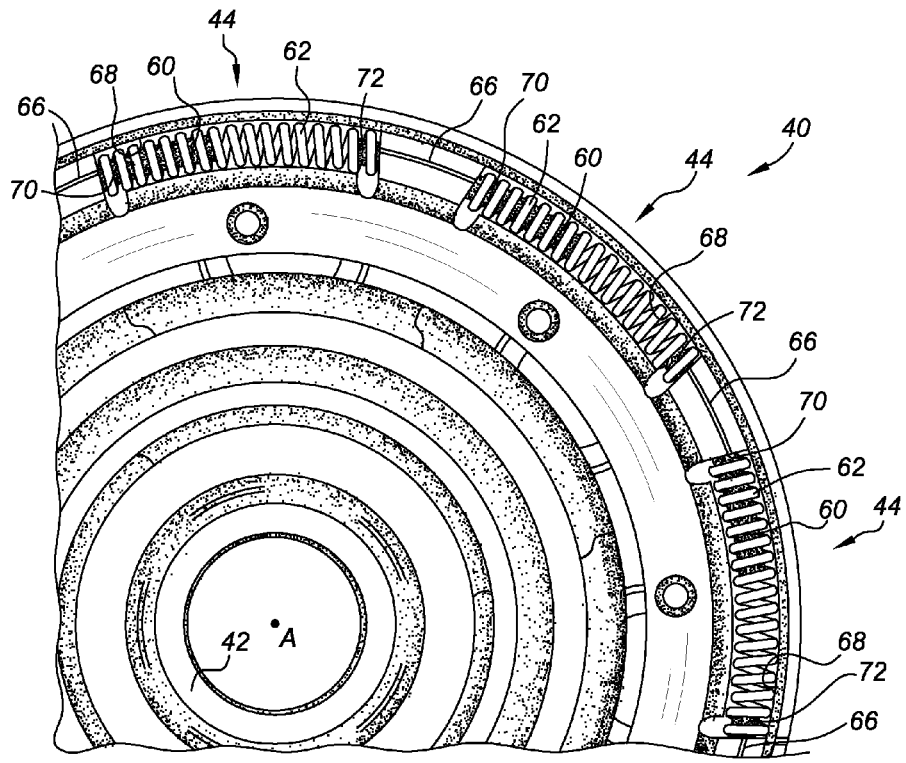
FIG. 3 is a front elevational view of a portion of the torsional damper assembly shown in FIG. 2 depicting a plurality of circumferentially oriented spring-mass damper systems operatively attached thereto.
Figure 4:
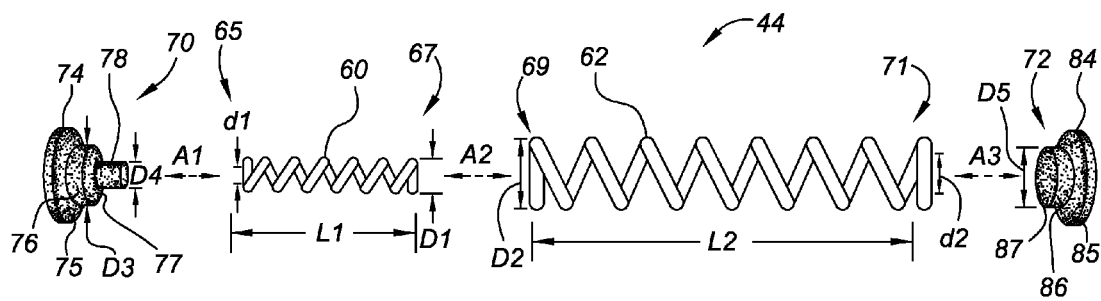
FIG. 4 is an exploded perspective view of one of the spring-mass damper systems from FIG. 3.

Referring to both FIGS. 3 and 4, the torsional damper assembly 40 includes a series of spring pockets 68 circumferentially located around the annular damper flange 42, contoured to operatively retain the plurality of SDS 44. In this regard, each SDS 44 includes a series of arcuate damper springs, such as inner and outer spring members 60 and 62, respectively, elongated circumferentially about the outer periphery of the annular damper flange 42 and spaced angularly about axis A between the front covers 30 and drive tang 46 of FIG. 2. Similarly oriented along the outer periphery of the annular damper flange 42, between the individual SDS 44, is a plurality of seat portions 66 adapted to receive the first and second spring retainers 70 and 72.

Looking to FIG. 4, an exploded perspective view of one of the SDS 44 from FIGS. 2 and 3 is provided illustrating how the first and second spring retainers 70, 72 engage with the inner and outer spring members 60, 62. The inner spring member 60 is of a first length L1, whereas the outer spring member 62 is of a second length L2 which is greater than the first length L1. In a similar regard, the inner spring member 60 defines a first inner diameter d1 and first outer diameter D1. The outer spring member 62 defines a second inner diameter d2 and second outer diameter D2. The second inner diameter d2 is sufficiently larger than the first outer diameter D1 to allow the inner spring 60 to nest inside the outer spring 62, as will be described in greater detail hereinbelow. Finally, the inner spring 60 is preferably stiffer (has a higher spring coefficient) than the outer spring 62.

The first spring retainer 70 includes a first base portion 74 having a first interface surface 75 with a first pilot portion 76 extending substantially perpendicular therefrom to define a third diameter D3. The first pilot portion 76 in turn has a second interface surface 77 with a second pilot portion 78 extending substantially perpendicular therefrom to define a fourth diameter D4. Similar to the first spring retainer 70, the second spring retainer 72 includes a second base portion 84 having a third interface surface 85 with a third pilot portion 86 extending substantially perpendicular therefrom to thereby define a fourth interface surface 87 and a fifth diameter D5. Although depicted in FIG. 4 as generally circular or cylindrical, the first and second spring retainers 60, 62, and their individual constituents (i.e., first, second, and third pilot portions 76, 78, 86) may take on other functional geometries without departing from the scope of the present invention. For example, the second pilot portion 78 of the first spring retainer 70 may take on any geometric configuration inscribable within the first inner diameter d1 of the inner spring 60 to secure, attach, or adhere the second pilot portion 78 to the inner spring 60 and thereby restrict relative movement therebetween.

Figure 4A:
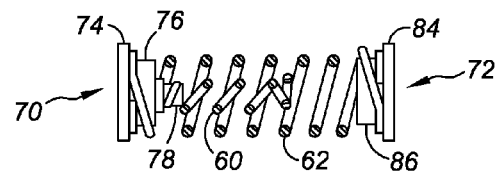
FIG. 4A is a side schematic view of a fully assembled spring-mass damper system from FIG. 4, partially broken away to more clearly illustrate how the first and second spring retainers operatively engage with the inner and outer spring members.

According to the preferred embodiment depicted in FIGS. 4 and 4A, the third diameter D3 of the first pilot portion 76 of the first spring retainer 70 is sufficiently larger than the first outer diameter D1 of the inner spring 60, whereas the fourth diameter D4 of the second pilot portion 78 of the first spring retainer 70 is slightly larger than the first inner diameter d1 of the inner spring 60. In this regard, the inner spring 60 is preferably coaxially pressed, forced, or urged relative to the first spring retainer 70 (illustrated in FIG. 4 by arrow A1) so as to press fit the inner spring 60 onto the second pilot portion 78 and operatively abut a first end 65 of the inner spring 60 against the second interface surface 77 of the first spring retainer 70, as best seen in FIG. 4A. The inner spring 60 is also fed or translated coaxially with respect to the outer spring 62 (illustrated in FIG. 4 by arrow A2) so as to press or abut a first end 69 of the outer spring 62 against the first interface surface 75 of the first spring retainer 70, and thereby nest the inner spring 60 inside the outer spring 62. Finally, the fifth diameter D5 of the third pilot portion 86 is preferably smaller than the second inner diameter d2 of the outer spring 62. To this regard, the outer spring 62 is preferably fed or translated axially relative to the third pilot portion 86 (illustrated in FIG. 4 by arrow A3) so as to abut or press a second end 71 of the outer spring 62 against the third interface surface 85 of the second spring retainer 72. According to the arrangement described above, the second end 67 of the inner spring 60 is distal to (i.e., does not contact) the second spring retainer 62 when the SMS 44 is in an inactive state, as can be seen best in FIG. 4A.

Ideally, the third and fifth diameters D3, D5 of the first and second spring retainers 70, 72, respectively, are equivalent to each other, and slightly less than the second outer diameter D2 of the outer spring 62. However, it is within the scope of the claimed invention that the third and fifth diameters D3, D5 be equal to or slightly greater than the second diameter D2 of the outer spring 62 (e.g., for press-fitting purposes), and need not be commensurate to one anther. In a similar respect, the fourth diameter D4 of the second pilot portion 78 may be less than the first inner diameter d1 of the inner spring 60, the inner spring 60 and first spring retainer 70 being joined by alternate methods (e.g., welding, riveting, adhesive, etc.). In one embodiment, the third and fifth diameters D3, D5 are less than the inner diameter d2 of the outer spring 62.

Referring to both FIGS. 2 and 3, the front cover 30 operates in conjunction with an annular driven plate extension 46, also referred to herein as a drive tang, to encase the torsional damper assembly 40 and lockup clutch 50 therebetween. The drive tang 46 is attached or joined at a base portion 53, preferably by way of rivet 47, to the turbine shell 45, and functions to mechanically engage with, and thereby actuate the individual SMS 44. The drive tang 46 also includes a plurality of individual flange portions, shown hidden in FIG. 2 as 55, each extending axially into a respective seat portion 66, FIG. 3, of the damper flange 42. As the lockup clutch 50 is engaged (i.e., the friction material 35 on clutch plate 52 is urged against the contact surface 27 of front cover 30 through operation of the hydraulic fluid 31) and begins to transmit toque (i.e., gain torque capacity independent of the turbine 24), the torsional damper assembly 40 is rotated about axis A. As a result of this rotational motion, one of the spring retainers 70, 72 of each SMS 44 is pressed against a respective flange portion 55 of the drive tang 46, thereby compressing the inner and outer springs 60, 62, as described hereinbelow.

The inner and outer damper springs 60, 62 absorb and dampen the unwanted torsionals produced by the engine 14 during normal, startup, and shutdown operations according to a progressive two phase or step-rate process—first, axial displacement of the damper flange 42 relative to the center axis of rotation A, causes unaccompanied compression of the outer spring 62 a distance between L1 and L2, and consequential absorption and attenuation of the aforementioned engine torsionals and vibrations by the outer spring 62 only. Once the outer spring 62 is compressed to a point where the fourth interface surface 87 of the second spring retainer 72 is proximate to and mechanically interfacing with the second end 67 of the inner spring 60, the inner and outer springs 60, 62 compressive collaboratively to absorb and attenuate engine torsionals and vibrations.

During conventional manufacturing of a torque converter assembly, such as torque converter 18, it is often necessary to rotatably balance the internal components of the torque converter, e.g., the impeller 22, turbine 24, stator 26, damper assembly 40, and lockup clutch 50, to provide for the smooth and efficient transmission of power along the powertrain 10. According to current practices, the individual components of the torque converter 18 are set in a balancing machine which rotates the assembly and measures any rotational eccentricity (e.g., asymmetric rotation of the torque converter 18 about center axis A) under normal operating conditions of the torque converter. Thereafter, the entire torque converter assembly 18 is fully assembled and balanced a second time (i.e., the rotational eccentricity of the entire apparatus is measured for corrective purposes.) Correction of any "unbalance" may be accomplished by fixing (e.g., welding) a balance weight to a portion of the torque converter housing (e.g., shell portion 28 or front cover 30 of FIG. 2) based upon the result of the measurement to offset the eccentricity. Historically, torque converter clutches designed with "loose" or "floating" springs, which provide a step-rate dampening effect, may be difficult to balance due to the indeterminate center of mass. The addition of the second pilot feature 78 to the first spring retainer 70, which is geometrically adapted to interlock, mate with, or press into the first end 65 of the inner spring 60, prevents unintentional movement of the inner spring 60 within the torque converter 18 during balancing and normal operation of the torque converter clutch 50 without degrading the functionality and operational life expectancy of the torque converter assembly 18.

While the best modes for carrying out the present invention have been described in detail herein, those familiar with the art to which this invention pertains will recognize various alternative designs and embodiments for practicing the invention within the scope of the appended claims.

The invention claimed is:

1. A torsional damper assembly for absorbing and attenuating torsionals and vibrations transmitted to a power transmission, the torsional damper assembly comprising:
a damper flange having an outer periphery;

at least one spring-mass damper system elongated circumferentially about said outer periphery of said damper flange and operatively attached thereto, said at least one spring-mass damper system including:
   an inner spring defining first inner and outer diameters;
   an outer spring defining second inner and outer diameters, said second inner diameter being sufficiently larger than said first outer diameter to allow said inner spring to be nestably positioned inside said outer spring;
   a first spring retainer having a first base portion defining a first interface surface, a first pilot portion extending from said first interface surface and defining a second interface surface, and a second pilot portion extending from said second interface surface; and
   a second spring retainer having a second base portion defining a third interface surface, and a third pilot portion extending from said third interface surface and defining a fourth interface surface;
   wherein said first and third interface surfaces are engaged with said outer spring, and said second and fourth interface surfaces are engaged with said inner spring;
   wherein said first and third pilot portions are engaged with and thereby restrict axial and radial movement of said outer spring;
   wherein said second pilot portion is operatively attached to and thereby restricts movement of said inner spring relative to said second pilot portion; and
wherein said inner spring is sufficiently shorter than said outer spring such that the inner spring does not contact the second spring retainer.

2. The torsional damper assembly of claim 1, wherein said operative attachment of said second pilot portion to said inner spring is a press fit.

3. The torsional damper assembly of claim 2, wherein said first and second base portions and said first, second, and third pilot portions are substantially cylindrical.

4. The torsional damper assembly of claim 3, wherein said first, second, and third pilot portions extend substantially perpendicularly from their respective interface surfaces.

5. The torsional damper assembly of claim 4, wherein said first and third pilot portions respectively define third and fifth diameters that are greater than said first outer diameter of said inner spring and less than said second inner diameter of said outer spring.

6. The torsional damper assembly of claim 5, wherein said second pilot portion defines a fourth diameter that is greater than said first inner diameter of said inner spring and less than said third diameter of said first pilot portion.

7. A transmission in power flow communication with a torque converter assembly to drivingly connect a final drive system to an engine, the engine characterized as generating compression pulses during one of a startup and shutdown operation and torsionals during other modes of operation, the transmission comprising:
   a damper flange having an outer periphery;
   a plurality of spring-mass damper systems elongated circumferentially about said outer periphery of said damper flange and operatively attached thereto, said spring-mass damper systems including:
      an inner spring defining a first length and first inner and outer diameters;
      an outer spring defining a second length that is greater than said first length and second inner and outer diameters, said second inner diameter being greater than said first outer diameter to allow said inner spring to be nestably positioned inside said outer spring;
      a first spring retainer having a first base portion defining a first interface surface, a substantially cylindrical first pilot portion extending substantially perpendicularly from said first interface surface and defining a second interface surface, and a substantially cylindrical second pilot portion extending substantially perpendicularly from said second interface surface; and
      a second spring retainer having a second base portion defining a third interface surface, and a substantially cylindrical third pilot portion extending substantially perpendicularly from said third interface surface and defining a fourth interface surface;
      wherein said first and third pilot portions are configured to engage with and thereby restrict axial and radial movement of said outer spring;
      wherein said inner spring is press fit with said second pilot portion of said first spring retainer to thereby restrict any relative motion therebetween; and
   wherein first length is sufficiently shorter than said second length such that the inner spring does not contact the second spring retainer.

* * * * *